United States Patent
Rogers et al.

(10) Patent No.: US 8,202,049 B2
(45) Date of Patent: Jun. 19, 2012

(54) INDEPENDENT BLADE PITCH CONTROL

(75) Inventors: Philip L. Rogers, Hume, VA (US); Frederick C. Belen, Jr., Oak Hill, VA (US); Elizabeth A. Dakin, Great Falls, VA (US); Priyavadan Mamidipudi, Bristow, VA (US)

(73) Assignee: Catch the Wind, Inc., Chantilly, VA (US)

( * ) Notice: Subject to any disclaimer, the term of this patent is extended or adjusted under 35 U.S.C. 154(b) by 0 days.

(21) Appl. No.: 13/032,431

(22) Filed: Feb. 22, 2011

(65) Prior Publication Data

US 2012/0051907 A1    Mar. 1, 2012

Related U.S. Application Data

(60) Provisional application No. 61/378,740, filed on Aug. 31, 2010.

(51) Int. Cl.
*F03D 7/04* (2006.01)
(52) U.S. Cl. .................. 416/1; 416/61; 416/155
(58) Field of Classification Search ............ 415/1, 61, 415/118, 155; 700/28, 32, 44, 67, 69, 71, 700/72, 89, 286; 416/1, 9, 41, 61, 118, 155
See application file for complete search history.

(56) References Cited

U.S. PATENT DOCUMENTS

| | | | |
|---|---|---|---|
| 2006/0033338 A1 | 2/2006 | Wilson | |
| 2009/0047116 A1* | 2/2009 | Barbu et al. | 415/1 |
| 2009/0311096 A1 | 12/2009 | Herr et al. | |

FOREIGN PATENT DOCUMENTS

| | | |
|---|---|---|
| KR | 10-2009-0008014 | 1/2009 |
| WO | WO 2009/134221 A1 | 11/2009 |
| WO | WO 2011/096928 A1 | 8/2011 |

OTHER PUBLICATIONS

PCT International Search Report mailed on Feb. 17, 2012 in corresponding application No. PCT/US2011/047922 in 3 pages.

* cited by examiner

*Primary Examiner* — Edward Look
*Assistant Examiner* — Aaron R Eastman
(74) *Attorney, Agent, or Firm* — Knobbe Martens Olson & Bear, LLP

(57) ABSTRACT

A system and method are provided to increase efficiency of turbines in wind farms. A sensor is configured to generate a wind map of an inflow of wind. A controller is configured to generate a control signal based the wind map. A pitch adjustment device configured to adjust pitch of a blade of the turbine based on the control signal.

17 Claims, 13 Drawing Sheets

INDEPENDENT BLADE PITCH CONTROL

CROSS-REFERENCE TO RELATED APPLICATIONS

This is application claims benefit under 35 U.S.C. 119(e) to U.S. Provisional Application No. 61/378,740, filed Aug. 31, 2010, which is incorporated by reference in this application in its entirety.

BACKGROUND

1. Field of the Invention

The invention generally relates to pitch control of a blade that is part of a wind turbine system.

2. Background Art

Increasing predictability, efficiency and lifetime of wind turbines is essential to continued advancement of wind-based clean energy. One way to increase power generation predictability and efficiency, and turbine life, is through active, dynamic pitch control of blades of the turbine, such that the blades are configured or positioned to most efficiently and effectively travel through incoming wind. However, current turbines use either no pitch control, or at most use reactive pitch control. Both negatively effect efficiency and life of the turbines as the blades are not optimally positioned to travel through the incoming wind causing increased stress and strain on the blades.

Reactive compensation results in damage already being done to turbines before adjustments are made. Also, reactive compensation usually results in shutting down and starting up a turbine many times when an undesirable inflow interacts with the turbine. Further, reactive compensation usually results in wind turbines that are larger than necessary, and thus more costly in terms of price and space within a wind farm. The turbines are larger than necessary because manufacturers overcompensate for worst case scenarios by increasing tolerances allowed for each turbine.

Further, by not being able to optimally interact with continually changing wind inflow, e.g., spatial and temporal changes of speed and direction of wind, a wind farm operator cannot achieve a maximum level of power generation output for which the turbines are rated.

Each of these factors increases expenses and negatively impacts the development and utilization of an important energy resource, i.e., wind.

SUMMARY

Therefore, what is needed is a system and method that can proactively and dynamically adjust a pitch of a blade of a turbine to more efficiently and effectively configure and orient the blade to travel through an inflow of wind.

An embodiment of the present invention provides a system comprising a sensor, a controller, and a pitch adjustment device. The sensor is configured to generate a wind map of an inflow of wind. The controller is configured to generate a control signal based the wind map. The pitch adjustment device is configured to adjust pitch of a blade of the turbine based on the control signal.

Another embodiment of the present invention provides a method comprising the following steps, not necessarily in the order presented or including all the steps discussed. Generating a three-dimensional wind map of inflow wind vectors to be received at a blade of a turbine. Producing actuator signals based on the wind map. Adjusting a pitch of the blade of the turbine based on the actuator signals.

A further embodiment of the present invention provides a method comprising the following steps, not necessarily in the order presented or including all the steps discussed. Measuring a wind map of inflow. Accessing control parameters of control system for a turbine, including active spanwise and independent sectional pitch control. Determining expected output power of the turbine. Choosing a blade set for the turbine based on the measuring, the accessing, and the determining.

A still further embodiment of the present invention provides a method comprising the following steps, not necessarily in the order presented or including all the steps discussed. Determining a first value corresponding to a size of a turbine blade. Determining a second value corresponding to a size of a turbine. Determining a third value corresponding to a configuration of one or more controllers and one or more corresponding actuators associated with one or more sections of the turbine blade. Determining a fourth value corresponding to a position of the turbine blade at a predetermined moment in time. Determining control parameters based on the first, second, third and fourth values. Accessing measured wind map data of inflow. Controlling pitch of the one or more sections of the turbine blade based on the control parameters and the wind map data.

Embodiments of the invention make it possible to increase the generation of electrical power from wind. Embodiments of the invention also make it possible to generate electrical power from wind in a more cost effective manner. Accordingly, embodiments of the invention materially contribute to the development of energy resources, as well as to the more efficient utilization of energy resources.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention FIG. 1 shows a wind turbine configured to perform wind mapping and pitch control, according to an embodiment.

FIGS. 5, 6, 7, 8, 9, 10, 11, and 12 illustrate example flowcharts depicting various methods allowing for pitch control of a blade of a turbine, according to embodiments.

Figure 13:
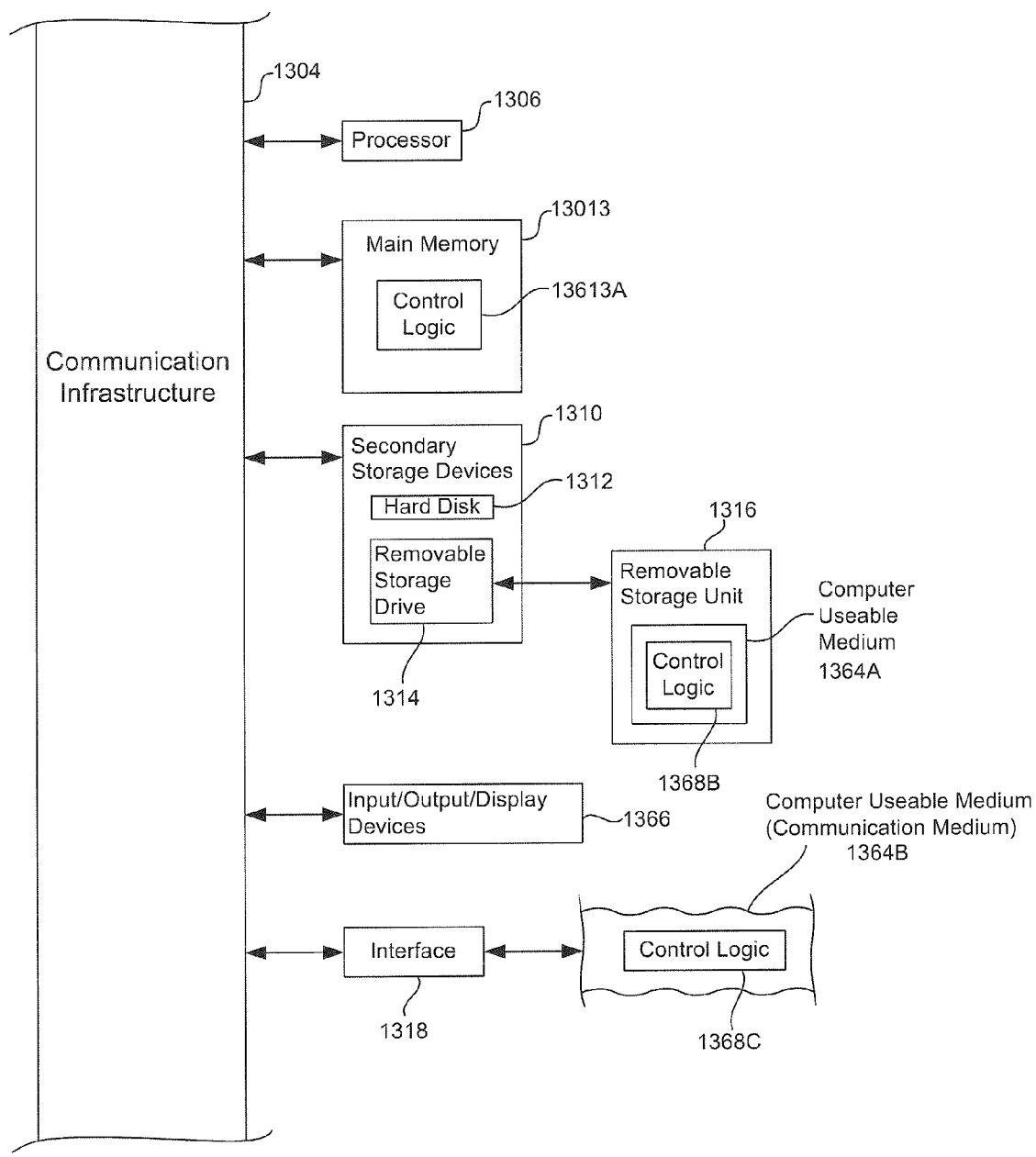

FIG. 13 illustrates an example computer useful for implementing components of embodiments.

The features and advantages of embodiments of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The embodiments of the present invention are provided to perform collective (coarse) or distributed (fine) adjustment of pitch along a span of a blade of a wind turbine. In one example, the pitch adjustment allows for active control of pitch with a high response rate, and may include a "smart" or continuously learning system. In various examples, the pitch control can be in response to a measured map data of inflow wind and/or parameters of the blade, turbine, measuring system, actuation system, etc. In one example, the map data and parameters are correlated to actuation and control signal values in a look-up table or database or determined by an algorithm. For example, these actuation or control signals allow for moving of coarse and/or fine adjustment devices, e.g., aerodynamic devices, which change a pitch of a blade as it travels through incoming wind. In alternative or additional embodiments, in additional to adjusting pitch for inflow of air, pitch can be adjusted for induced wake effects (e.g., caused by trees, mountains, buildings, proximate turbines in a wind farm, etc.), atmospheric conditions surrounding the wind farm, transitional stress caused during adjustment for yaw, tilt stress, etc.

Through the various embodiments of the present invention, a substantial increase in clean wind energy can be generated from smaller and less costly turbines, e.g., 1-2 MW turbines. For example, these relatively smaller turbines can produce energy that currently is only generated using more costly and larger turbines, e.g., 4 MW turbines. In one example, this can reduce the footprint of a wind farm. Further, a life of a turbine can be substantially increased due to more effectively managing fatigue life of the turbine by reducing stresses caused by not knowing what inflowing wind looks like. This, in turn, also can substantially reduce downtime and maintenance costs of individual turbines or an entire wind farm. Accordingly, embodiments of the invention materially contribute to the development of wind energy resources, as well as to the more efficient utilization of wind energy resources.

Before describing such example embodiments in more detail, however, it is instructive to present an example environment in which embodiments of the present invention may be implemented.

Figure 1:
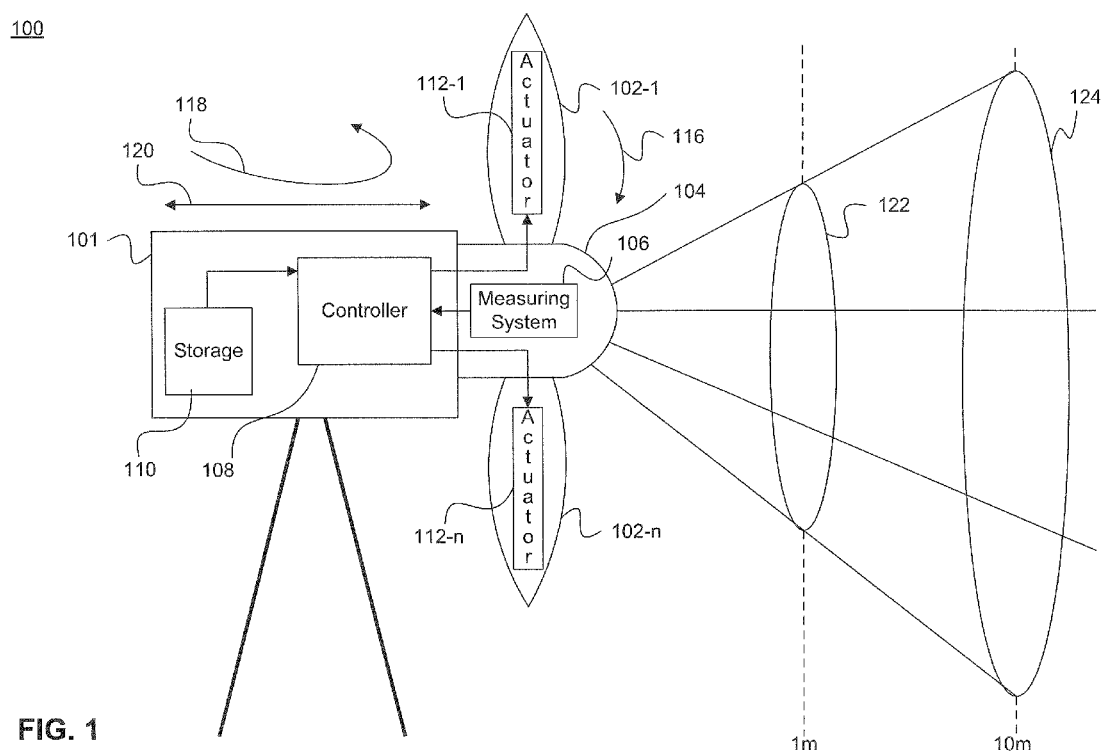

FIG. 1 shows a wind turbine 100 configured to perform wind mapping and pitch control. Wind turbine 100 includes a nacelle 101, one or more blades 102-1 to 102-$n$ ($n$ being an integer preferably greater than 1, although even turbines with a single blade can benefit from the advantages of the invention), a hub 104, a measuring system 106, a controller 108, storage 110, one or more actuators 112-1 to 112-$n$, each associated with respective blades 102-1 to 102-$n$, and a tower 114. For reference, arrow 116 illustrates an exemplary rotation direction of blades 102, although it is appreciated blades 102 can rotate in either direction. Arrow 118 illustrates a direction of any yaw being experienced by turbine 100. Arrow 120 illustrates any tilt being experienced by turbine 100. As is discussed below, values associated with rotation, tilt, and yaw, along with many other parameters of turbine 100, can be measured by measuring system 106 and used by controller 108 and/or stored in storage 110 to produce control or actuations signals used by actuator 112 to adjust pitch of blade 102.

In one example, turbine 100 can be used in a wind farm to generate clean energy. As will be described in detail below, through use of embodiments described herein, efficiency and effectiveness of the operation of turbine 100 is greatly increased, such that smaller wind turbines can be used to reduce a footprint of a wind farm, while producing more power than is typically being generated today by much larger turbines in much larger wind farms. The increase in power generation per turbine can result from, e.g., continuous measuring of three-dimensional wind maps and correlation of the wind maps to appropriate control signals used to adjust pitch of individual blades and/or to independently adjust pitch for an array of sections along each blade. In one example, each blade can include fine and coarse pitch adjusters, as discussed in detail below.

In one example, measuring system 106 is incorporated into hub 104. In another example, measuring system 106 can be coupled to hub 104. Measuring system 106 can measure three-dimensional wind maps of wind inflowing into turbine 100 through transmission and receipt of light beams using scattering or reflection techniques. In essence, the wind maps represent information corresponding to what turbine 100 and its blades 102 will see when looking into the air. For example, measurements can be made to account for continuous spatial and temporal changes in speed and direction of wind. In one example, a velocimeter is used for the measurements.

In one example, not intended to limit the invention, measurements taken by measuring device 106 can be done in accordance with a velocimeter describe in the disclosures of Published International Application WO2009/134221 and/or International Application PCT/US10/23270, both of which are incorporated by reference herein in their entireties. For the sake of brevity, the description of measuring wind maps will not be discussed in detail herein. In summary, slices of sets of wind vectors are measured at various distances from turbine 100, such as but not limited to slice 122 at 1 m and slice 124 at 10 m. Each set of wind vectors is used to determine speed and direction of wind in the slice of incoming wind that will eventually interact with blades 102. As can be appreciated, at each point along a blade a different speed and direction of wind can be received since wind exhibits non-uniform velocity. Thus, a fine resolution of data can be captured through measuring device 106 that presents information regarding the characteristics of the wind (i.e., "what the wind will look like") that will interact with each individual section of blade 102.

Additionally, in another example, measuring system 106, and/or another measuring system (not shown), can determine position and speed of each blade 102 and/or a plurality of sections along each blade 102, e.g., with respect to ground. For example, speed and location of a tip and root of each blade 102 as blade 102 is rotating and moving through the inflow can be measured. These additional measurements can be used to allow for more fine adjustment of pitch along each blade 102. These additional measurements can be important to determine an actual travel angle and speed of each blade 102 with respect to the inflow of air.

In another example, measuring system 106, and/or another measuring device (not shown), can be used to determine tilt and yaw of turbine 100. For example, when there is a misaligned in yaw, a yaw adjustment can be made. When mis-yaw conditions occur, there is a transition between a misaligned yaw position and an aligned yaw position. During this transition, unaccounted for transients can occur to turbine 100 or blade 102. Thus, additional pitch control of blade 102 based on the mis-yaw condition can be used to further reduce the transients on blade 102 until the transition is completed.

In a still further example, measuring system 106, and/or another measuring device (not shown), can be used to determine induced wake caused by structures (not shown) proximate turbine 100 in a wind farm. By example, but not by limitation, induced wake can be caused by other turbines, trees, mountains, buildings, etc.

Additionally, or alternatively, measuring system 106, and/or another measuring device (not shown), can be used to determine atmospheric conditions in a predetermined area surrounding turbine 100 or the wind farm. For example, the atmospheric data can be received at controller 108 from a remote source of information or a remote sensor. Through this high-level measurement of general atmospheric conditions, a more predictive model of what can be expected in the inflow can be determined, possibly through historical analysis. In one example, this model can be fine tuned using the real-time, continuously measured map data. The continuous updating of received/stored information can result in, e.g., an almost artificial intelligence effect of using the past to better predict the future, while also using the present to better predict the future. Thus, a smart model and smart system can result that takes into account both large picture and small picture views of the wind, as well as utilizing real-time and historical data.

In one example, by taking all these wind factors into account, vibrational noise that may be generated by a wind farm can be substantially reduced. This reduction can result from properly adjusting and orienting blades 102 such that they never, or substantially never, encounter an unexpected air inflow, and always, or substantially always, optimally travel through the airflow. Such operation greatly increases energy production while decreasing turbine downtime and maintenance costs.

In another example, as discussed below in FIG. 6, initial map data can be further processed to filter out or otherwise eliminate outlier values, e.g., minimums and maximums, beyond a certain standard deviation. This filtering can result in smoother map data and more accurate control signals.

The measurements made above by measuring system 106, and/or an alternative measuring device, are meant to be illustrative, but not exhaustive or limiting.

In one example, controller 108 receives measured values from measuring system 106, from storage 110, and alternatively, or additionally, from remote measuring or storage devices (not shown). Controller 108 uses the measured and/or stored values to generate control signals that can be transmitted to actuators 112. In turn, actuators 112 are used to control pitch of blades 102, as will be described in more detail below. In one example, controller 108 can be hardware, software, firmware, or any combination thereof. For example, controller 108 can be programmable control logic with underlying program code and/or a processor or microprocessor.

In one example, storage 110 can store information related to historical wind data and wind map data for the region in which the turbine 100 or wind farm is located, received atmospheric data (e.g., received through a wired or wireless network), information relating to the geometry, size, materials, weight, and other parameters of turbine 100 and/or blades 102, information relating to operation or characteristics of other turbines located proximate to turbine 100, information related to measuring system 106 (e.g., a speed and/or resolution of any sensors being used in measuring system 106), information related to actuators 112 (e.g., a configuration or operational parameters), etc. Such listing of information that may be stored in storage 110 is provided for purposes of illustration, and not limitation.

In one example, this additional stored or measured information can be used to determine timing of delivery of actuator signals. For example, by understanding (a) when a slice of the wind map 122 will arrive at turbine 100, (b) the processing speed and resolution of measuring system 106, and (c) the response time of actuators 112, it is possible to determine and utilize a minimum amount of time required to send a control or actuation signal from controller 108 to actuator 112 to achieve a desired pitch adjustment along blade 102.

In one example, actuators 112 are used to perform a spanwise actuation of a pitch control device (not shown, see FIGS. 3 and 4) in order to most optimally orient each blade 102 with respect to incoming wind based on one or more measured and/or stored parameters. For example, this pitch control can be used to alleviate unnecessary degradation of fatigue life of blade 102 caused by unnecessary stress and to increase efficiency and energy generation of turbine 100.

Figure 3:
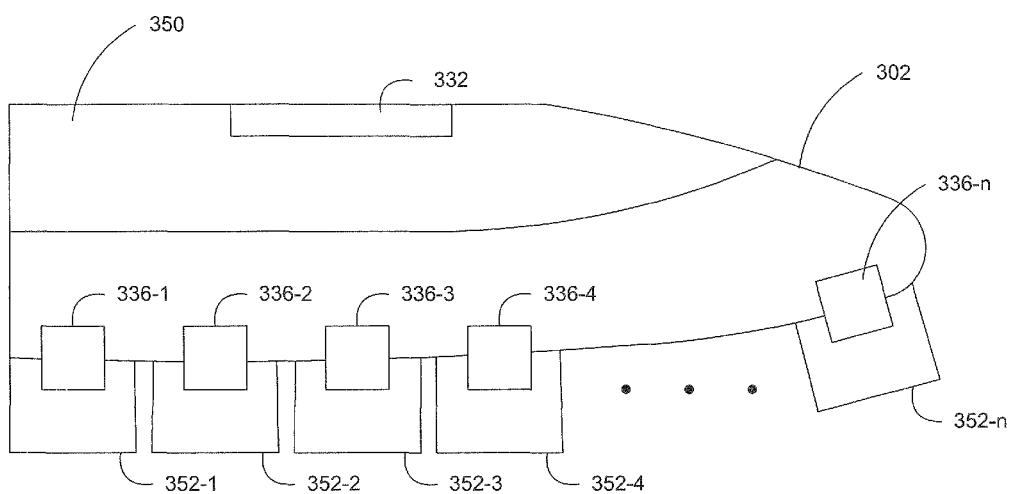
FIG. 3 shows a perspective view of an actuating system used to actuate aerodynamic devices on a blade of a wind turbine to control pitch of the blade, according to an embodiment.
Figure 4:
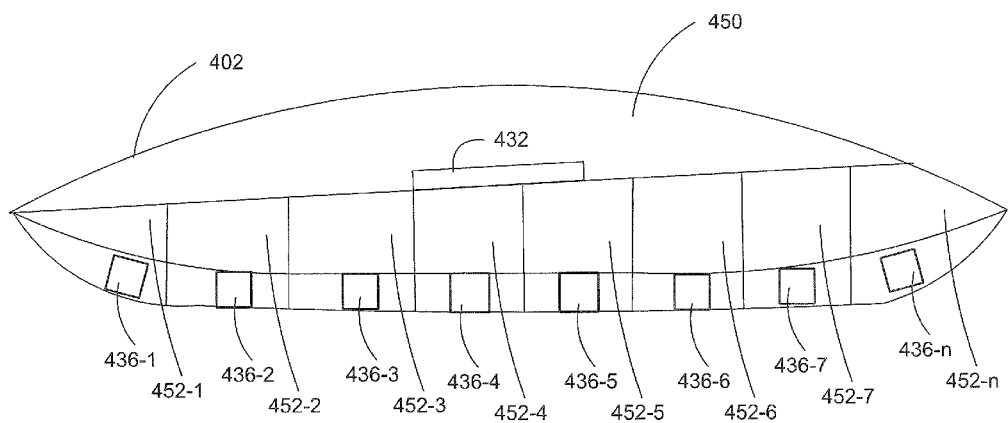
FIG. 4 shows a top view of an actuating system used to actuate aerodynamic devices on a blade of a wind turbine to control pitch of the blade, according to an embodiment.

Additionally, or alternatively, actuators 112 can comprise an array of independently controlled actuators coupled to different or even overlapping sections of blade 102 (not shown, but see FIGS. 3 and 4). In this way, very complex adjustment(s) of any portion of the receiving surface of each blade 102 (including the entire receiving surface) can be performed to most optimally interact with the incoming wind.

Figure 2:
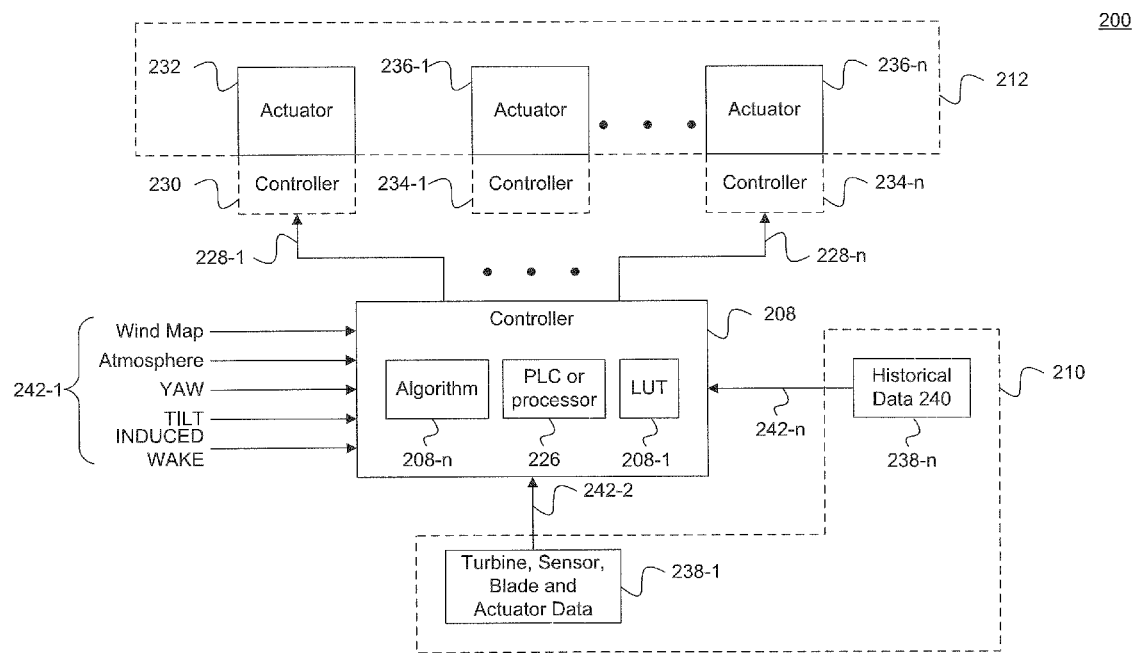
FIG. 2 shows a control system that allows for pitch control of a blade of a wind turbine, according to an embodiment.

FIG. 2 shows a system 200 that allows for pitch control of a blade of a wind turbine. For example, system 200 can be incorporated into turbine 100 in FIG. 1. In the example shown, system 200 includes a controller 208, storage 210, and an actuator 212.

In one example, controller 208 can include a programmable logic controller(s) and/or processor(s) 226 and one or more separate controlling or processing portions 208-1 to 208-n. For example and without limitation, 208-1 to 208-n can be one or more look up tables (LUTs), databases, or functional algorithms. The LUTs can provide very fine granularity.

In one example, data inputs 242-1 to 242-n are received at controller 208. For example, data inputs 242-1 can be, without limitation, measured or determined wind maps, atmospheric data, yaw, tilt, induced wake, etc. Also, for example, data inputs 242-2 can be, without limitation, turbine, blade, sensor, and actuator data, and 242-n can be historical wind data. In one example, turbine data can include a size and estimate power of the turbine, blade data can include speed, position, twist, geometry, material makeup, length, width, weight, and configurations of any aerodynamic devices (see FIGS. 3 and 4), sensor or measuring system data can include speed and resolution of the sensor, and actuator data can include speed and configuration of the actuator(s). In various examples, each of the inputs 242 can be received through a wired or wireless connection between a measuring or storage device, shown or unshown, and controller 208.

In one example, through knowing all of the measured values and parameters, controller 208 can more effectively manage transmission of control or actuations signals 228. For example, knowing a wind map, actuator response time, and sensor processing speed and resolution, controller 208 can more accurately determine when is the last moment in time an incoming inflow can be measured to be able to timely produce a control signal 228 that will reach an actuator 212 in time to move a pitch adjusting device (not shown) to properly align with incoming wind. This can allow for the most optimal and accurate positioning and orientation of a blade to travel through the inflowing wind to reduce the most stress on the blade and turbine and produce the most energy from the turbine.

In one example, the LUTs or algorithms 208-1 to 208-n are specifically configured, in various embodiments of the present invention, to correlate or calculate, respectively, received data inputs 242-1 and data inputs 242-n to generate or produce control or actuation signals 228-1 to 228-n. The control or actuation signals 228 can be transmitted from controller 208 to actuator 212 to optimally adjust pitch in one or more sections along one or more blades, as discussed in more detail throughout this description. The coarse and fine adjustment of pitch can result in more efficient power production, while reducing strain, stress, and fatigue on a turbine.

In one example, the LUTs and algorithms 208-1 to 208-n can be developed based on historical wind data captured up until a current measuring and adjusting cycle. For example, before building a wind farm, data can be collected regarding wind maps occurring daily, weekly, monthly, yearly, etc. In another example, after building a wind farm, data can be collected regarding wind maps occurring daily, weekly, monthly, yearly, etc. Also, known meteorological data for the area of the wind farm can be accessed or collected. Further, real-time data can be captured and processed.

Also, in some examples, the LUTs and algorithms 208-1 to 208-n can take into account all known characteristics and parameters of the configuration and operation of specific pitch control system being used. For example, how fast a signal travels from a controller to a device, how fast a device begins to react once the signal is received, how fast in degrees/ per second a particular actuator functions. All this data can then be processed and correlated to form a model.

In various examples, the model can be used to either store correlation data into a LUT or used to generate functional algorithms 208-1 to 208-n. The LUT data or algorithm could be used to generate control or actuation signals that reflect:

"WHEN "A" OCCURS IN A WIND MAP DO "B" TO THE PITCH OF BLADE"

or

"WHEN "A" OCCURS IN A WIND MAP AND "B" OCCURS FOR TURBINE/BLADE DO "C" TO THE PITCH OF A BLADE."

In an embodiment, the same control/actuation signals are sent to all blades, or are customized for each blade, or are customized for each moveable part of each blade. Any combination of the foregoing, operating and adapting on a real-time basis, is also contemplated by embodiments of the invention.

Additionally, or alternatively, to increase the accuracy, these models, and thus the LUTs and algorithms 208-1 to 208-n, can be continuously or periodically updated as wind data is continuously captured.

In another example, either in addition to or in the alternative, wind data from similar wind farms and/or dissimilar wind farms either in a similar area or different area can either be used to build a model used to generate initial LUTs or algorithms 208-1 to 208-n or used to further adjust initial LUTs or algorithms 208-1 to 208-n.

In one example, the LUT or algorithm 208-1 to 208-n can include thresholds or ranges that may require more or less aggressive pitch control. As pitch control can require a certain amount of resources and energy, in one example pitch control may only occur if a required pitch change is above a certain threshold value or between certain threshold values. Further, a faster or slower pitch change can be based on whether an amount of pitch control is above a threshold or within a range. In this way, only appropriate energy is expended by the independent blade pitch control system 200.

In one example, storage 210 can include one or more individual storage devices, e.g., 238-1 to 238-n, which can be individual physical devices or individual partitioned sections of a main storage, or both. For example, in the configuration shown, a turbine, blade, sensor, and actuator data storage device 238-1 and a historical data device 238-n are shown. As can be appreciated, any number of individual storage devices or partitioned sections 238 can be used based on a specific application. For example, this can be done to store parameters associated with one or more parts of turbine 100 to be used to most optimally use the wind data to adjust pitch of a blade (not shown).

In one example, actuator 212 includes a plurality of actuators including a coarse adjusting actuator 232 and an array of fine adjusting actuators 236-1 to 236-n. Although one actuator 232 is shown, more may be used. Also, any number of fine adjusting actuators 236 may be used. Actuators may be, but are not limited to, motors, electrical motors, pneumatic actuators, hydraulic actuators, linear actuators, comb drive, piezoelectric actuators, screw drive actuators, solenoids, etc. In one example, actuators 232 and 236 receive control or actuation signals 228-1 to 228-n directly from controller 208.

In another example, optionally actuator 232 has an associated controller 230, shown in phantom, and actuators 236 have associated controllers 234-1 to 234-n, also shown in phantom. Controllers 230 and 234 would receive a signal from controller 208, or alternatively from measuring device 206, and generate actuation or control signals based thereon. In this way, processing power can be distributed among several controllers, as appropriate in various applications. For example, this may speed up pitch control when many different actuators 236 are used.

In other examples, not shown, a single controller 234 can be used to control all the fine adjusting actuators 236 or several controllers 234 can be used to control one or more sub-sets of fine adjusting actuators 236.

FIG. 3 shows a top-down view of an actuating system 300 used to actuate aerodynamic devices 350 and 352-1 to 352-*n*. Aerodynamic devices 350 and 352 can be one of on, coupled to, or integrated with a blade 302 of a wind turbine (not shown) to control pitch of blade 302. In this example, a spanwise aerodynamic device 350, e.g., a flap, tab, airfoil, etc., is moved through interaction with an actuator 332. Although only one actuator 332 is shown, it is appreciated more may be used. Also, an array of aerodynamic devices 352-1 to 352-*n*, e.g., flaps, tabs, airfoils, etc., are moved through interaction with corresponding actuators 336-1 to 336-*n*. Sections 352 and related actuators 336 are collectively or individually controlled, and any number of sections 352 and related actuators 336 can be used at any given time to provide optimal movement of a blade 302 through wind.

In one example, each of actuators 332 and 336 can be actuated at, for example and without limitation, about 1 degree per second to about 8 degrees per second.

In an example operation, each actuator 332 and 336 receives an actuation or control signal from a controller (not shown, see FIGS. 1 and 2). The actuation signal can either result in no movement or a precise angular adjustment of the respective aerodynamic devices 350 and 352. In this way, pitch of blade 302 can be controlled coarsely or collectively, using aerodynamic device 350, finely using aerodynamic device 352, or both, to most accurately align blade 302 with a wind map of incoming wind to increase power generation efficiency and decrease fatigue.

In the example shown, a coarse and fine adjusting configuration is shown, although these may be used alone or in combination. For example, only coarse adjustments may be made or only fine adjustments may be made, or both, in different applications.

FIG. 4 shows a top view of an actuating system 400 used to actuate aerodynamic devices 450 and 452-1 to 452-*n*. Aerodynamic devices 450 and 452 can be one of on, coupled to, or integrated with a blade 402 of a wind turbine (not shown) to control pitch of blade 402. In this example, a spanwise aerodynamic device 450, e.g., a flap, tab, airfoil, etc., is moved through interaction with an actuator 432. Although only one actuator 432 is shown, it is appreciated more may be used. Also, an array of aerodynamic devices 452-1 to 452-*n*, e.g., flaps, tabs, airfoils, etc., are moved through interaction with corresponding actuators 436-1 to 436-*n*. Sections 452 and related actuators 436 are collectively or individually controlled, and any number of sections 452 and related actuators 436 can be used at any given time to provide optimal movement of a blade 402 through wind.

In one example, each of actuators 432 and 436 can be actuated at, for example and without limitation, about 1 degree per second to about 8 degrees per second.

In an example operation, each actuator 432 and 436 receives an actuation or control signal from a controller (not shown, see FIGS. 1 and 2). The actuation signal can either result in no movement or a precise angular adjustment of the respective aerodynamic devices 450 and 452. In this way, pitch of blade 402 can be controlled coarsely or collectively, using aerodynamic device 450, finely using aerodynamic device 452, or both, to most accurately align blade 402 with a wind map of incoming wind to increase power generation efficiency and decrease fatigue.

Figure 5:
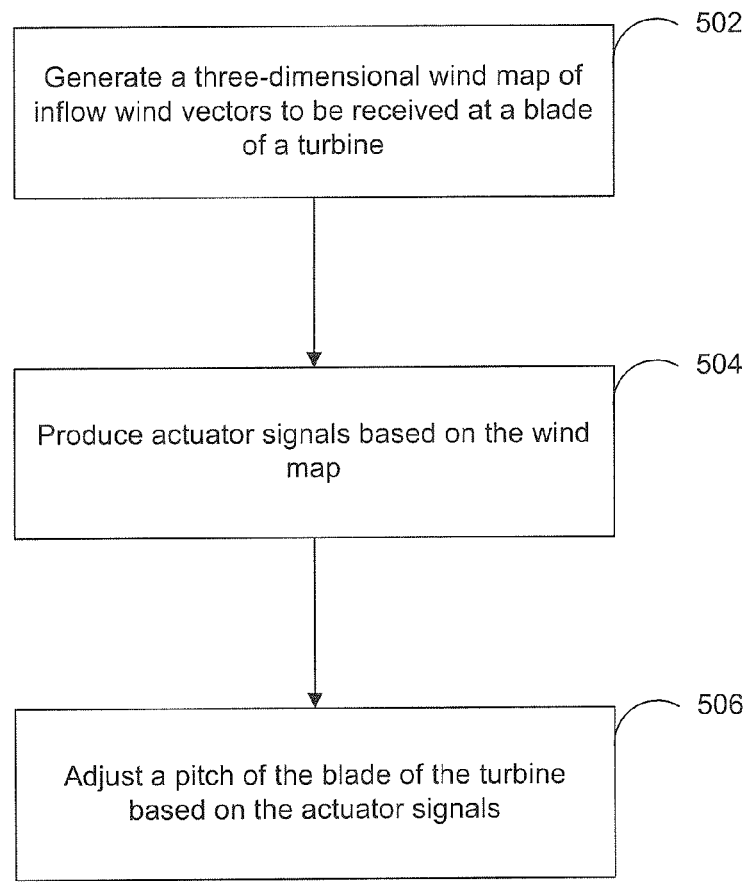

FIG. 5 illustrates a flowchart depicting a method 500. In one example, method 500 can be performed by one of systems 100-400 or 1300. Although shown in a certain order, method steps may not be performed in the order shown, or require all the steps shown. In step 502, a three-dimensional wind map of inflow wind vectors to be received at a blade of a turbine is generated. In step 504, actuator signals based on the wind map are produced. In step 506, a pitch of the blade of the turbine is adjusted based on the actuator signals.

In one example, step 504 comprises accessing the actuator signals stored in a look up table based on the wind map generated in step 502. The LUT is searched to correlate the wind map to an actuator signal value. Additionally, or alternatively, step 504 comprises calculating the actuator signals based on processing the wind map using an algorithm.

Figure 6:
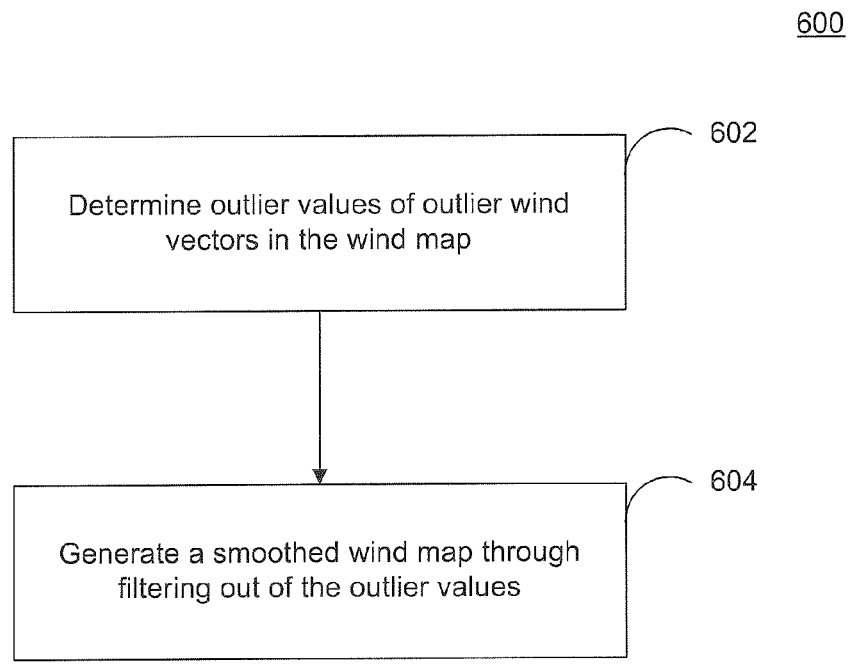

FIG. 6 illustrates a flowchart depicting a method 600. In one example, method 600 can be performed by one of systems 100-400 or 1300. Although shown in a certain order, method steps may not be performed in the order shown, or require all the steps shown. In one example, method 600 is performed as part of step 502 in FIG. 5. In step 602, outlier values of outlier wind vectors in the wind map are determined. In step 604, a smoothed wind map is produced through filtering out of the outlier values. In this alternative process, the smoothed wind map can be used in step 504 instead of the originally determined wind map.

Figure 7:
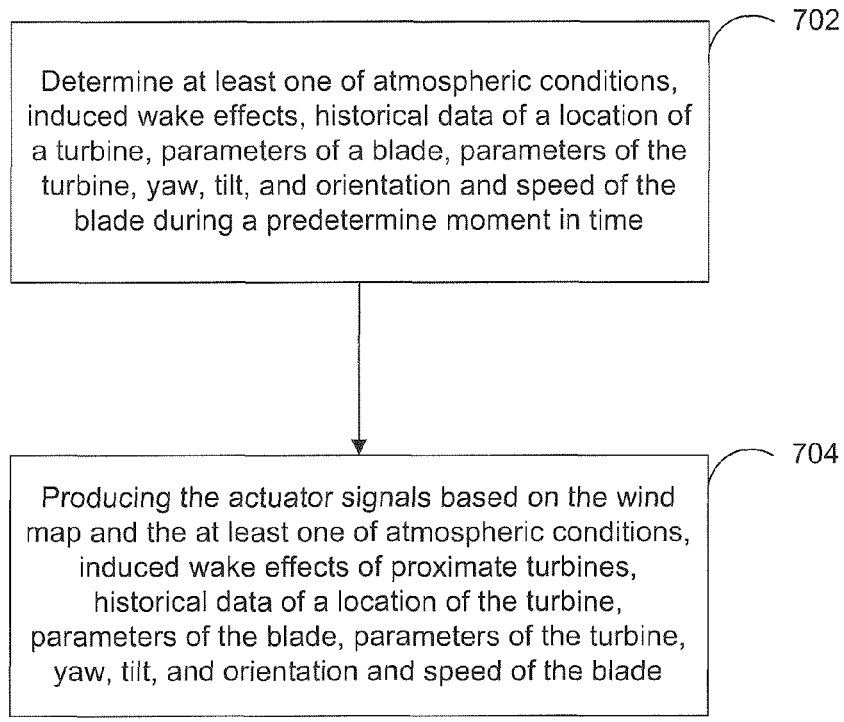

FIG. 7 illustrates a flowchart depicting a method 700. In one example, method 700 can be performed by one of systems 100-400 or 1300. Although shown in a certain order, method steps may not be performed in the order shown, or require all the steps shown. In one example, method 700 can be used in addition to steps 502 and 504 in FIG. 5. In step 702, at least one of atmospheric conditions, induced wake effects, historical data of a location of a turbine, parameters of a blade, parameters of the turbine, yaw, tilt, and orientation and speed of the blade are determined during a predetermined moment in time. In step 704, actuator signals are produced or adjusted based on the wind map and the at least one of atmospheric conditions, induced wake effects, historical data, parameters of the blade or the turbine, yaw, tilt, and orientation and speed of the blade.

Figure 8:
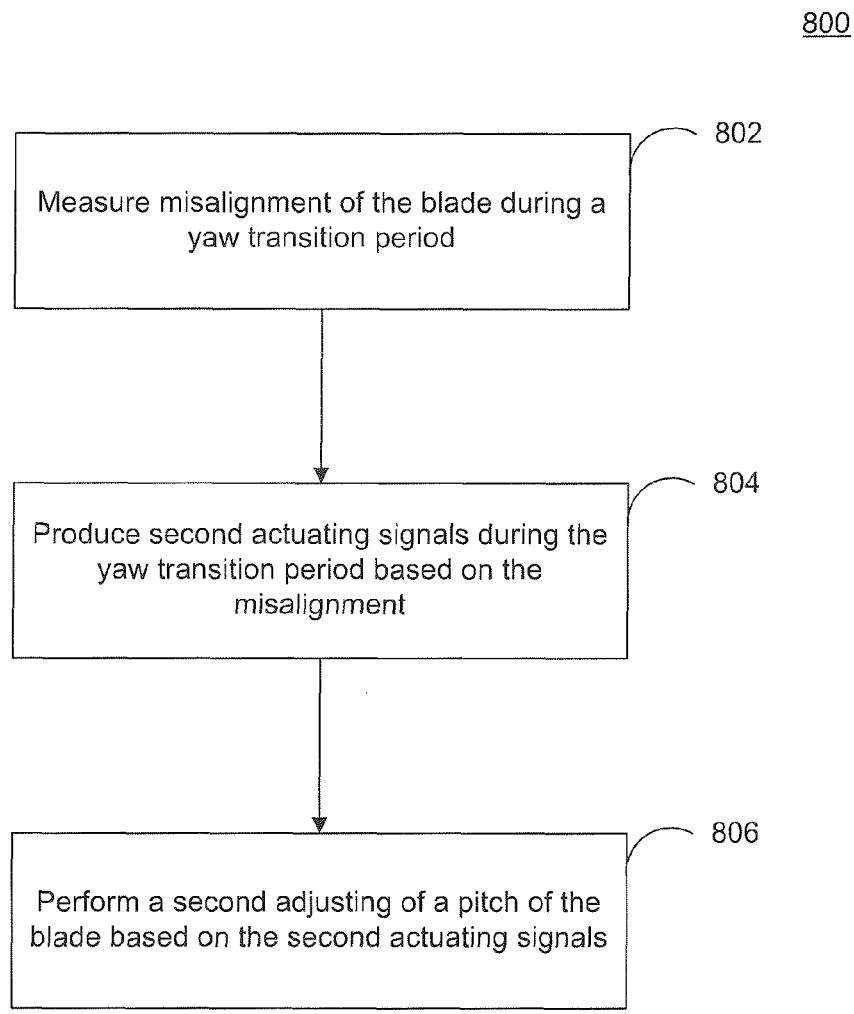

FIG. 8 illustrates a flowchart depicting a method 800. In one example, method 800 can be performed by one of systems 100-400 or 1300. Although shown in a certain order, method steps may not be performed in the order shown, or require all the steps shown. In one example, method 800 can be used to compensate for stress and strain on a blade during a yaw transition period. In step 802, misalignment of the blade during a yaw transition period is measured. In step 804, second actuating signals are produced during the yaw transition period based on the misalignment. In step 806, a second adjusting of a pitch of the blade based on the second actuating signals is performed.

Figure 9:
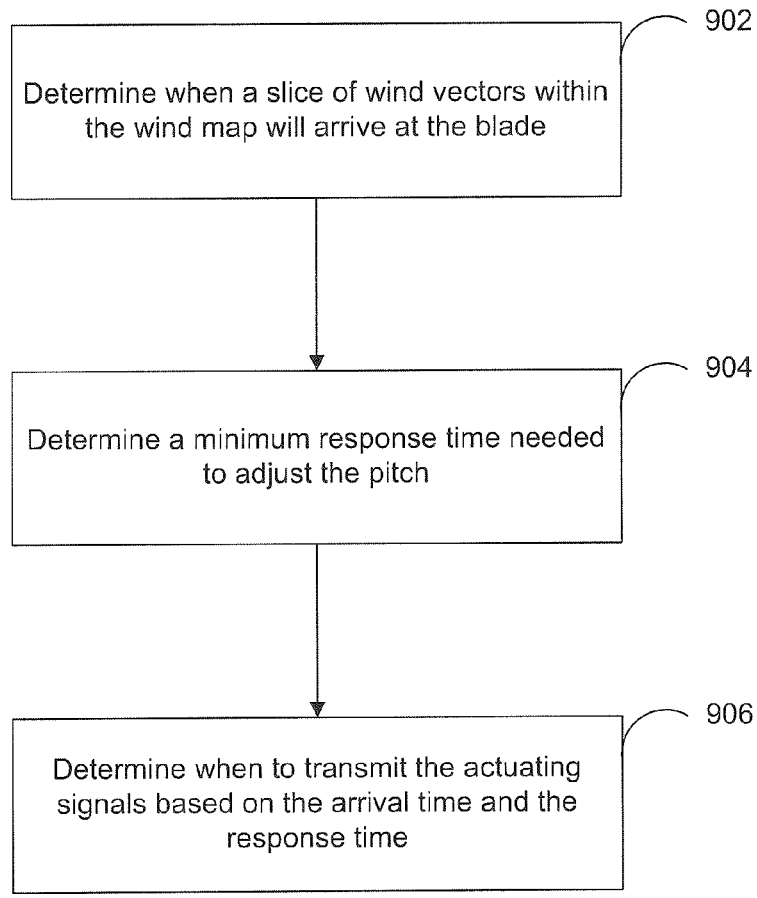

FIG. 9 illustrates a flowchart depicting a method 900. In one example, method 900 can be performed by one of systems 100-400 or 1300. Although shown in a certain order, method steps may not be performed in the order shown, or require all the steps shown. In one example, method 900 can be used between steps 504 and 506 in FIG. 5. In step 902, an arrival time is determined for when a slice of wind vectors within the wind map will arrive at the blade. In step 904, a minimum response time needed to adjust the pitch is determined. In step 906, a moment in time is determined as to when to transmit the actuating signals based on the arrival time and the response time.

Figure 10:
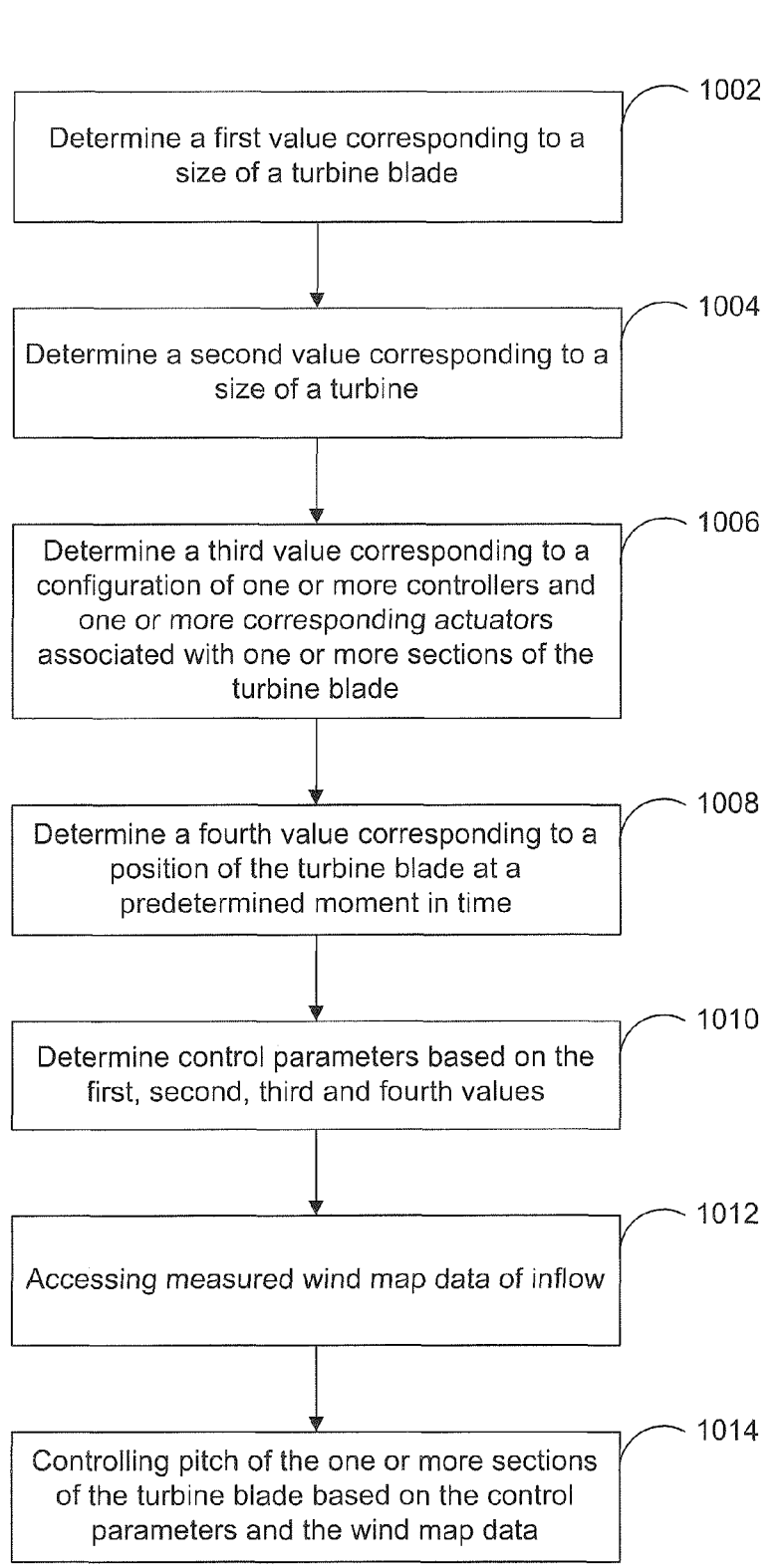

FIG. 10 illustrates a flowchart depicting a method 1000. In one example, method 1000 can be performed by one of systems 100-400 or 1300. Although shown in a certain order, method steps may not be performed in the order shown, or require all the steps shown. In step 1002, a first value corresponding to a size of a turbine blade is determined. In step 1004, a second value corresponding to a size of a turbine is determined. In step 1006, a third value corresponding to a configuration of one or more controllers and one or more corresponding actuators associated with one or more sections of the turbine blade is determined. In step 1008, a fourth value corresponding to a position of the turbine blade at a predetermined moment in time is determined. In step 1010, control parameters based on the first, second, third and fourth values are determined. In step 1012, wind map data of inflow is accessed. In step 1014, pitch of the one or more sections of the turbine blade is controlled based on the control parameters and the wind map data.

Figure 11:
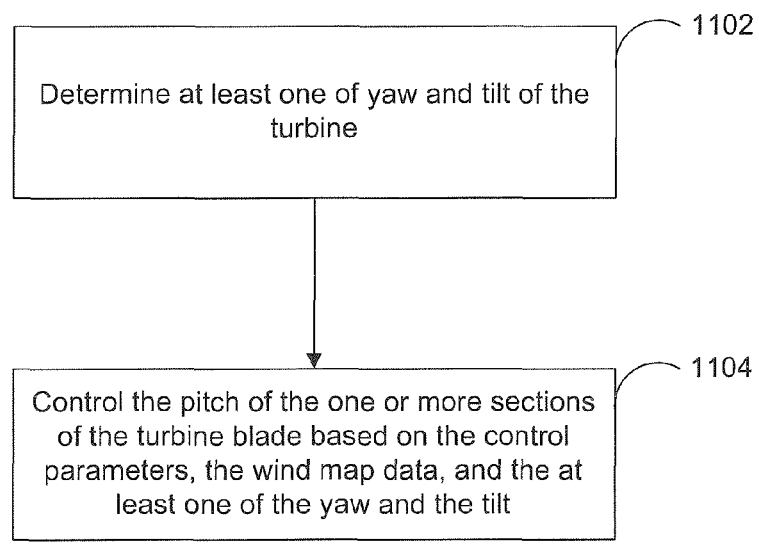

FIG. 11 illustrates a flowchart depicting a method 1100. In one example, method 1100 can be performed by one of systems 100-400 or 1300. Although shown in a certain order, method steps may not be performed in the order shown, or require all the steps shown. In one example, method 1100 can be used before, during, or in place of steps 1010 and 1014 in FIG. 10. In step 1102, at least one of yaw and tilt of the turbine is determined. In step 1104, the pitch of the one or more sections of the turbine blade is controlled based on the control parameters, the wind map data, and the at least one of the yaw and the tilt.

Figure 12:
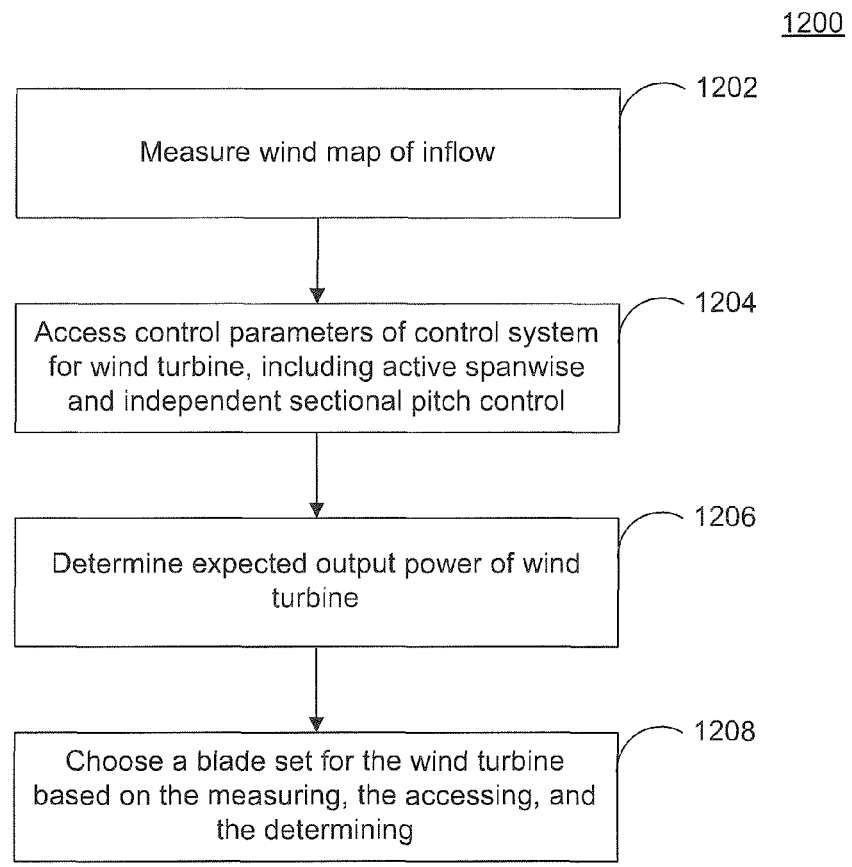

FIG. 12 illustrates a flowchart depicting a method 1200. In one example, method 1200 can be performed by one of systems 100-400 or 1300. Although shown in a certain order, method steps may not be performed in the order shown, or require all the steps shown. In step 1202, a wind map of an inflow of wind is measured. In step 1204, control parameters of a control system for a turbine, including parameters used for active spanwise and independent sectional pitch control, are accessed. In step 1206, expected or desired output power of the turbine is determined. In step 1208, a blade set for the turbine is chosen based on the measuring step 1202, the accessing step 1204, and the determining step 1206. In this manner, it is possible to control the amount of power generated by a turbine and, thus, by a wind farm. Such control may be useful for overall energy grid management.

In an embodiment, the system, components, and operations of embodiments described herein are implemented using one or more computers, such as example computer 1302 shown in FIG. 13. For example, controller 108 and/or 208 or methods 500-1200 can be implemented using computer(s) 1302.

Computer 1302 can be any commercially available and well known computer capable of performing the functions described herein, such as computers available from International Business Machines, Apple, Oracle, HP, Dell, Cray, etc.

Computer 1302 includes one or more processors (also called central processing units, or CPUs), such as a processor 1306. Processor 1306 is connected to a communication infrastructure 1304.

Computer 1302 also includes a main or primary memory 1308, such as random access memory (RAM). Primary memory 1308 has stored therein control logic 1368A (computer software), and data.

Computer 1302 also includes one or more secondary storage devices 1310. Secondary storage devices 1310 include, for example, a hard disk drive 1312 and/or a removable storage device or drive 1314, as well as other types of storage devices, such as memory cards and memory sticks. Removable storage drive 1314 represents a floppy disk drive, a magnetic tape drive, a compact disk drive, an optical storage device, tape backup, etc.

Removable storage drive 1314 interacts with a removable storage unit 1316. Removable storage unit 1316 includes a computer useable or readable storage medium 1364A having stored therein computer software 1368B (control logic) and/or data. Removable storage unit 1316 represents a floppy disk, magnetic tape, compact disk, DVD, optical storage disk, or any other computer data storage device. Removable storage drive 1314 reads from and/or writes to removable storage unit 1316 in a well known manner.

Computer 1302 also includes input/output/display devices 1366, such as monitors, keyboards, pointing devices, Bluetooth devices, etc.

Computer 1302 further includes a communication or network interface 1318. Network interface 1318 enables computer 1302 to communicate with remote devices. For example, network interface 1318 allows computer 1302 to communicate over communication networks or mediums 1364B (representing a form of a computer useable or readable medium), such as LANs, WANs, the Internet, etc. Network interface 1318 may interface with remote sites or networks via wired or wireless connections.

Control logic 1368C may be transmitted to and from computer 1302 via communication medium 1364B.

Any tangible apparatus or article of manufacture comprising a computer useable or readable medium having control logic (software) stored therein is referred to herein as a computer program product or program storage device. This includes, but is not limited to, computer 1302, main memory 1308, secondary storage devices 1310 and removable storage unit 1316. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

It is to be appreciated that the above-noted systems and methods can be used by turbine and wind farm designers and operators, turbine manufacturers, controller manufacturers, actuator manufacturers, retrofit operators that update wind farms and turbines, energy grid operators and managers, etc. Embodiments including these systems and processes can be used to increase power output, increase efficiency, reduce costs and size, and provide a more predictable energy output from wind energy and wind farms.

Accordingly, embodiments of the invention materially contribute to the development of wind energy resources, as well as to the more efficient utilization of wind energy resources.

Discussed below are various embodiments of current and contemplated wind turbine control schemes. Given that wind turbines have to operate through the dynamics of uncertain and imperfect airflow, sensors and controls can make a major contribution to performance and profitability. The existence of nacelle-mounted look-ahead laser wind sensors, capable of not only high data rates but also of various schemes to map the inflow, allows for the various embodiments discussed below. Incremental improvements in turbine efficiency and stress control are expected that should lead to an optimized control/sensor suite.

Collecting wind data at the rear of the wind turbine nacelle may result in several significant compromises. First, both the effect of the bluff body of the nacelle itself and the blade blockage effects on the airflow have to be corrected using wind speed dependent transfer functions. These empirical correction factors do not account for any flow regimes other than perfect yaw alignment, so in periods of even the slightest misalignment to the wind, the transfer function no longer accurately corrects the measurement. Secondly, the flow encountered at the rear of the nacelle is heavily affected by the wash or wake of the passing blades. Current practice is to use long (up to 10 minute) rolling or binned averages to smooth out the wake impulses. Not only is this imprecise, it also disguises actual fluctuations in the wind and drastically affects the response time of the control system. Thirdly, the information measured at the rear of the turbine is obtained after the air mass has passed the turbine. There is therefore no possible way to have proactive, anticipatory or feed-forward control using this data.

Installation of strain measurement into the blades, towers, shafting or other components gives an indication of operating conditions. These stresses and strains can be linked to a feedback control loop. While this provides one direct measurement of the turbine's interaction with the wind, it only generates a sensed control trigger after the mechanisms have already experienced excess stress and strain. Stress and vibration data is difficult to use for discerning whether a yaw or blade pitch correction is needed. Using strain feedback, the duration of this undesirable condition can be reduced, but events still use up the finite fatigue life of the components prematurely. This approach also increases the cost of the blades and other instrumented components.

In an embodiment of the present invention, the addition of a forward measuring laser wind sensor provides the control system accurate wind direction information in the undisturbed flow as it approaches the wind turbine. Tests using just this more accurate wind direction information have demonstrated both significant increased power output and reduced stresses from better alignment to the wind. A forward-looking laser not only provides a more accurate flow direction, but the absence of blade wake effects allows this information to be fed to the control system without long averaging periods. Less averaging informs the control system of the actual flow dynamics as they occur. By virtue of the laser wind sensor measuring wind at various ranges in front of the wind turbine, control actions gain anticipatory data for feed-forward controlling. This can be implemented as merely a timing advantage to reduce lag in yaw corrections, as well as the ability to track wind changes and gusts to determine not only their predicted time of arrival at the wind turbine, but also to inform the control logic with information on the "depth" or duration of an approaching gust.

In one example, a laser wind sensor looking ahead in the inflow can also provide the blade pitch control logic with wind speed changes and wind speed gusts before they arrive at the blades. This information also can allow estimation of the precise arrival timing to correlate with the reaction times of the pitch control mechanism, e.g., as discussed above. The result is a reduction of time spent at a suboptimal blade angle to the flow and experiencing unexpected loads or stress.

Laser wind sensors can be designed to provide multiple measurement points simultaneously at known locations in the inflow to provide spatial flow mapping at multiple ranges. With this spatial wind speed and direction information, the shear and veer of the flow in the inflow can be determined in real time. The pitch control of each blade can then be timed to the sweep angle so that it is optimized based on the spatial wind conditions it is actually passing through. While laser wind direction data can greatly improve the alignment with the wind over time, the relatively slow yaw response of the large nacelle mass compared to the rates of wind direction change results in transients of misalignment which can be addressed with individual blade pitch adjustments to minimize the vibration caused by the leading/following blade effects. This is similar in concept to the blade pitch adjustments made on helicopters to compensate for the relative airspeed of leading/following blades in forward flight.

While current turbine designs are based on unitary blades that account for the span-wise (radially) differences of flow and moment with taper and twist, those designs are based on the assumption of a uniform flow field perfectly normal to the plane of the blade rotation. In fact, as a result of spatial and temporal wind speed and direction variations, the flow field at any point in time is not truly uniform in the radial direction. Even informed individual blade pitch control has to select a best compromise angle of attack for the entire blade length and does not have the ability to handle span-wise flow differences. As discussed above, with real-time spatial wind speed and direction data from a laser sensor, high response rate aerodynamic devices along the blade span could be actuated to correspond to local relative wind. This could be implemented using various flaps, jets, or tabs as developed for aircraft wings or rigid sails. Combined with the other control advances, this stage represents an optimization of active controls.

Ever increasing sophistication is projected for wind turbine sensors and controls with resultant increases in efficiency and reductions of undesirable stresses. Wind turbine control practice can match theory using forward-looking laser wind sensors, which can provide the needed wind accuracy, timeliness, data rates, and spatial mapping.

Examples of current wind turbine controls may be, e.g., corrected and averaged nacelle anemometer and wind vane, strain feedback, accurate yaw alignment, and feed forward yaw control. Example of potential wind turbine controls may be, e.g., feed forward collective blade pitch control, spatial individual blade pitch control, yaw transient individual blade pitch control, spanwise aerodynamic blade control, etc. Each current and potential advance should lead to more power and less stress.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A system, comprising:
   a sensor configured to generate a wind map of an inflow of wind;
   a controller configured to generate a control signal based on the wind map;
   a pitch adjustment device configured to adjust pitch of a blade of a wind turbine based on the control signal;
   a yaw detection system configured to generate at least a transition yaw signal during a transition time period;
   wherein the controller is further configured to generate the control signal to control the pitch based on the transition yaw signal to reduce transient loads and vibration on the blade during the transition time period.

2. The system of claim 1, wherein the sensor comprises a velocimeter.

3. The system of claim 1, wherein the sensor is configured to generate the wind map based on at least one of:
   real-time wind slice data at one or more distances from the sensor;
   a model of atmospheric conditions during one or more time periods; and
   induced wake effects.

4. The system of claim 1, wherein the wind map comprises continuously sampled temporally and spatially changing wind velocity and direction.

5. The system of claim 1, wherein the controller comprises at least one of:
   a programmable logic controller; and
   a look-up table that correlates pitch adjustment to the wind map to generate the control signal.

6. The system of claim 1, wherein the controller is configured to:
   process the wind map based on using an algorithm to generate the control signal; and
   determine timing of an adjustment of the pitch of a blade of a wind turbine based on the control signal using a prediction process based on the wind map and stored historical data.

7. The system of claim 1, wherein the controller is further configured to generate the control signal based on at least one of:
   a determined timewise location of the blade of the wind turbine correlated to the wind map;
   a known response time of the pitch adjustment device;
   a known response time of the sensor; and
   stored historical wind data,
   wherein timing of transmission of the control signal from the controller to the pitch adjustment device is based on the known response time of the pitch adjustment device.

8. The system of claim 1, wherein the pitch adjustment device comprises:
   an aerodynamic device coupled to or integrated with the blade of the wind turbine.

9. The system of claim 8, wherein the aerodynamic device comprises a spanwise tab or flap.

10. The system of claim 1, further comprising:
    one or more fine pitch adjustment devices coupled to respective sections along the blade and configured to independently adjust a pitch of the respective sections of the blade based on the control signal,
    wherein the fine pitch adjustment devices comprise a plurality of aerodynamic devices located at each of the respective sections configured to perform the fine pitch adjustment.

11. The system of claim 10, wherein the plurality of aerodynamic devices comprise tabs or flaps.

12. A method, comprising:
    determining a first value corresponding to a size of a wind turbine blade;
    determining a second value corresponding to a size of a wind turbine;
    determining a third value corresponding to a configuration of one or more controllers and one or more corresponding actuators associated with one or more sections of the wind turbine blade;
    determining a fourth value corresponding to a position of the wind turbine blade at a predetermined moment in time;
    determining control parameters based on the first, second, third and fourth values;
    accessing wind map data of an inflow of wind;
    determining at least one of yaw and tilt of the wind turbine; and
    controlling pitch of the one or more sections of the wind turbine blade based on the control parameters, the wind map data, and the at least one of the yaw and the tilt.

13. A method, comprising:
    generating a three-dimensional wind map of inflow wind to be received at a blade of a wind turbine;
    producing a control signal based on the wind map;
    adjusting a pitch of the blade of the wind turbine based on the control signal;
    measuring misalignment of the blade during a yaw transition period;
    producing a second control signal during the yaw transition period based on the misalignment; and
    adjusting the pitch of the blade based on the second control signal.

14. The method of claim 13, further comprising:
    determining outlier wind vectors in the wind map; and
    generating a smoothed wind map through filtering out of the outlier wind vectors,
    wherein the producing of the control signal is based on the smoothed wind map.

15. The method of claim 13 further comprising:
    determining at least one of atmospheric conditions, induced wake effects, historical data of a location of the wind turbine, parameters of the blade, parameters of the wind turbine, yaw, tilt, and orientation and speed of the blade during a predetermined moment in time,
    wherein the producing of the control signal further comprises using the wind map and at least one of atmospheric conditions, the induced wake effects, the historical data of the location of the wind turbine, the parameters of the blade, the parameters of the wind turbine, the yaw, the tilt, and the orientation and speed of the blade.

16. The method of claim 13, wherein the producing further comprises:
   accessing the control signal in a look up table including correlations between the wind map and a control signal value; and
   calculating the control signal based on processing the wind map using an algorithm.

17. The method of claim 13, further comprising:
   determining an arrival time corresponding to when a slice of wind vectors within the wind map will arrive at the blade;
   determining a response time of the adjusting of the pitch; and
   determining when to transmit the control signal based on the arrival time and the response time.

* * * * *